(No Model.)
G. W. BROWN.
LUBRICATOR.
No. 382,752. Patented May 15, 1888.
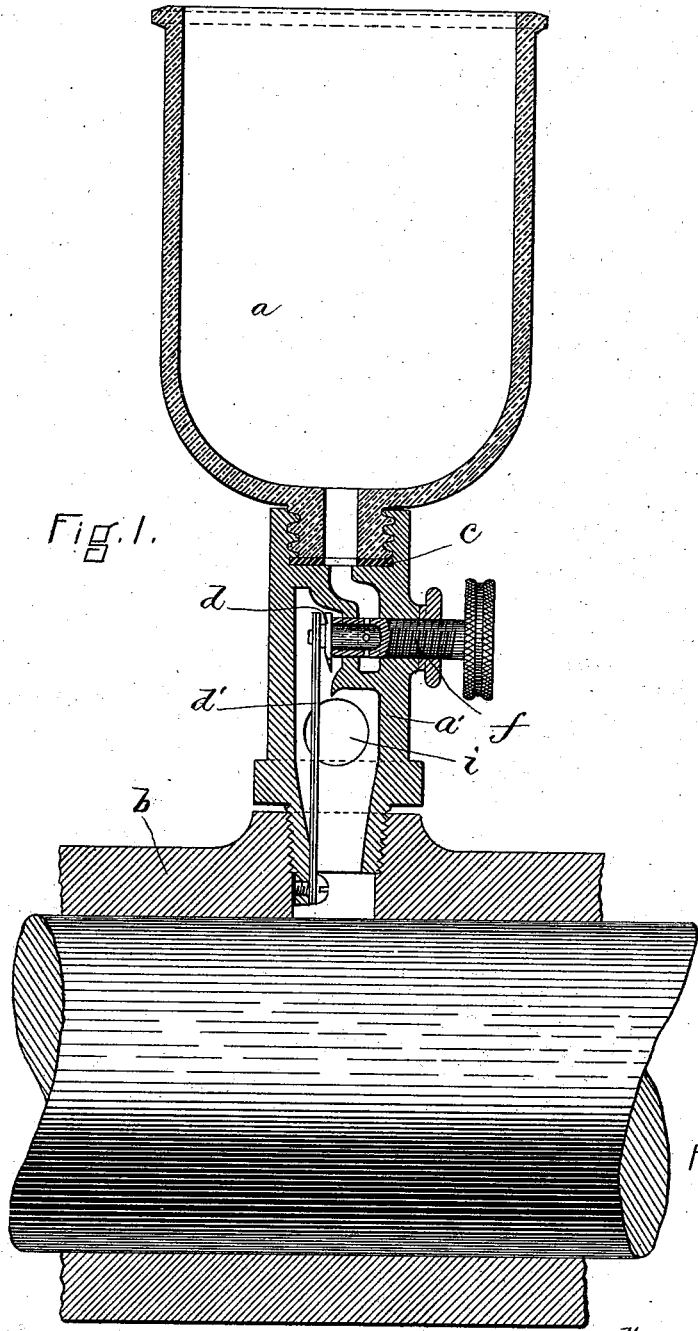
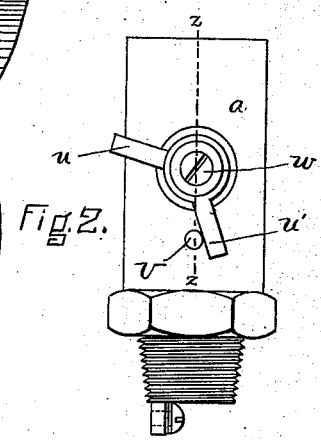
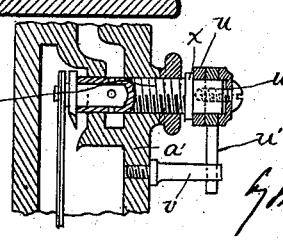
WITNESSES:
H. Brown.
J. E. Smith.
INVENTOR:
Gilman W. Brown

UNITED STATES PATENT OFFICE.

GILMAN W. BROWN, OF WEST NEWBURY, MASSACHUSETTS.

LUBRICATOR.

SPECIFICATION forming part of Letters Patent No. 382,752, dated May 15, 1888.

Application filed December 19, 1887. Serial No. 258,320. (No model.)

*To all whom it may concern:*

Be it known that I, GILMAN W. BROWN, of West Newbury, in the county of Essex and State of Massachusetts, have invented certain new and useful Improvements in Lubricators, of which the following is a specification.

This invention has for its object to provide a lubricator for bearings of shafting, &c., in which the flow of oil shall be regulated by the temperature of the bearing, so that a given increase in the temperature of the bearing will cause an increased flow of oil from the lubricator, while a corresponding decrease in the temperature will check or decrease the flow.

To this end the invention consists in a lubricator having a discharge-orifice and a thermostatic or compound bar controlling the flow of oil, and arranged to be so affected by the temperature of the bearing with which the lubricator is used as to be moved and permit an increased discharge of oil when the temperature of the bearing is raised above a given point, and to be closed and check or decrease the flow of oil when the temperature of the bearing is sufficiently reduced, as I will now proceed to describe.

Of the accompanying drawings, forming a part of this specification, Figure 1 represents a vertical section of a lubricator embodying my invention. Fig. 2 represents a side elevation of the shank of an oil-cup similar to that shown in Fig. 1, but provided with stop devices. Fig. 3 represents a section on line $z\ z$, Fig. 2.

The same letters of reference indicate the same parts in all the figures.

In the drawings, $a$ represents an oil cup or receptacle, and $b$ represents a bearing with which said cup may be connected in any suitable way—as, for example, by a shank, $a'$, formed on the cup and screwed into a threaded aperture in the bearing, as shown in Fig. 1, said shank having a conduit through which oil passes from the cup to the bearing.

The body of the cup is preferably made of glass and provided with a threaded stem, which is screwed into a socket in the shank, a packing, $c$, of cork or other suitable material, being placed between the stem and the bottom of the socket.

In carrying out my invention I provide at any suitable point between the oil-reservoir and the bearing a thermostatic bar, $d'$, composed of layers or laminæ of different metals, each layer having a different rate of expansion and contraction from that of the other, said bar being constructed and arranged to open the conduit and permit the flow of oil to the bearing when the temperature of the bearing is increased by friction beyond a given degree, and to close the conduit when the temperature is reduced by lubrication. The arrangement of said bar may be variously modified. In Figs. 1 and 2 I have shown it composed of two metals of different expansibility, as steel and brass, said metals being formed in strips secured together to constitute the bar. One end of said arm is rigidly secured to any suitable support in close proximity to the bearing, as the shank $a'$, while the free end is secured to a valve, $d$; or, if preferred, the free end of the bar may constitute the valve.

The valve bears on the delivering end of the oil-conduit, and is separated from said delivering end by the flexure of the thermostatic arm whenever the temperature of the bearing is sufficiently increased to expand the metals of said arm.

The delivering end of the oil-conduit is here shown as a tubular screw, $f$, inserted in a threaded socket in the shank $a'$, and passing through the portion of the conduit which is formed in said shank. The screw has lateral openings through which the oil passes into the bore of the screw. The screw may be adjusted to compensate for any variations in the normal position of the thermostatic arm $d'$, and insure proper contact of the valve with its seat when said arm is not bent from its normal position.

I prefer to form a transverse slot or sight-aperture, $i$, in the shank $a'$, said slot being of sufficient size to expose the valve $d$ and the delivering end of the screw $f$, so that the feed of oil will be visible.

In practice it is desirable to have a constant opening through the valve to maintain at all times a normal feed of oil, the operation of the thermo-dynamic devices being intended mainly to insure an increased flow of oil when from any cause the normal feed is not sufficient to prevent heating. When the shaft is not running, the screw $f$ may be turned so as to cause the valve to entirely stop the flow of oil.

To enable the screw $f$ to be moved either to its valve opening or closing position without the necessity of careful adjustment by the attendant, I provide it with two arms, $u\ u'$, and attach to the shank $a'$ a stop-pin, $v$, located between said arms, so that when the screw is turned in one direction the arm $u$ will strike said stop and arrest the motion of the screw when the latter is in its valve-opening position, and when the screw is turned in the opposite direction the arm $u'$ will strike said stop and arrest the screw in its valve-closing position. The operator is therefore relieved of all care in adjusting the screw, as will be readily seen.

I prefer to make the arms $u\ u'$ adjustable on the screw $f$, so that the positions of the screw when it is arrested may be adjusted. To this end I make said arms in independent pieces, which are clamped by a screw, $w$, against a shoulder, $x$, on the screw $f$. By loosening said clamping-screw the arms may be adjusted to any desired position.

I do not limit myself to the use of the improvement last described in connection with a thermo-dynamic valve; but may use the same with any suitably-constructed valve.

I claim—

1. An oil cup or receptacle having a thermostatic or compound arm or bar regulating the discharge of oil therefrom and adapted to be operated by variations of temperature of the bearing to which the oil-cup is applied, as set forth.

2. The combination of a bearing, an oil cup or receptacle adapted to supply oil thereto, and a thermostatic or compound arm or bar regulating the flow of oil from the cup and arranged to be operated by variations of temperature of the bearing, as set forth.

3. An oil cup or receptacle having a neck or shank provided with an oil-conduit combined with a valve, and a thermostatic arm or bar supporting said valve and arranged to be bent to displace the valve by an increase in the temperature of the bearing.

4. An oil cup or receptacle having a neck or shank provided with an oil-conduit and a sight-aperture, combined with a valve in said aperture, and a thermostatic arm or bar supporting said valve, as set forth.

5. An oil cup or receptacle having a neck or shank provided with an oil-conduit, composed in part of an adjustable tubular screw and a sight-aperture into which said screw projects, combined with the valve arranged to act on the delivering end of said conduit, and the thermostatic bar supporting said valve, as set forth.

6. An oil cup or receptacle provided with an oil-conduit composed in part of an adjustable screw, combined with a valve at the delivering end of the screw, and stop devices, substantially as described, whereby the rotation of the screw may be arrested both in the valve-opening and valve closing positions of said screw, as set forth.

In testimony whereof I have signed my name to this specification, in the presence of two subscribing witnesses, this 15th day of December, A. D. 1887.

GILMAN W. BROWN.

Witnesses:
C. F. BROWN,
A. D. HARRISON.